United States Patent [19]
Symons et al.

[11] Patent Number: 5,886,857
[45] Date of Patent: Mar. 23, 1999

[54] HEAD SUSPENSION WITH ALIGNMENT MEASUREMENT PATTERN

[75] Inventors: John B. Symons; Raymond R. Wolter, both of Hutchinson, Minn.

[73] Assignee: Hutchinson Technology Inc., Hutchinson, Minn.

[21] Appl. No.: 933,642

[22] Filed: Sep. 19, 1997

[51] Int. Cl.$^6$ .................................................... G11B 5/48
[52] U.S. Cl. ............................................................. 360/104
[58] Field of Search ............................................. 360/104

[56] References Cited

U.S. PATENT DOCUMENTS

| | | | |
|---|---|---|---|
| 5,201,458 | 4/1993 | Hagen | 360/104 |
| 5,493,463 | 2/1996 | Hagen. | |
| 5,570,249 | 10/1996 | Aoyagi et al.. | |

OTHER PUBLICATIONS

Chebyshev Reference Software for the Evaluation of Coordinate Measuring Machine Data, by G.T. Anthony, et al., Oct. 1993, pp. 3, 53–56.

Quindos Form/Position, Brown & Sharpe, Manual No. 938–193, Sections 2.6.1–2.6.3 and Language Reference Manual—Part 2.

*Primary Examiner*—A. J. Heinz
*Attorney, Agent, or Firm*—Faegre & Benson LLP

[57] ABSTRACT

The present invention is a magnetic disk drive head suspension of the type having a load beam and a flexure, including an alignment measurement pattern on either the load beam or the flexure. The flexure is mounted to a distal end of the load beam, and the alignment measurement pattern is used to evaluate and quantify the position of the flexure relative to the load beam. The alignment measurement pattern includes a plurality of openings adjacent a tooling reference hole that are sized and positioned to expose the outer perimeter of a corresponding tooling reference hole. In this manner, the alignment measurement pattern provides an accurate assessment of the alignment between the load beam and the flexure by indicating the offset of the flexure tooling hole relative to the load beam tooling hole.

15 Claims, 9 Drawing Sheets

HEAD SUSPENSION WITH ALIGNMENT MEASUREMENT PATTERN

TECHNICAL FIELD

The present invention relates to the manner of constructing a head suspension for use in dynamic storage devices or rigid disk drives. More particularly, the present invention provides features to a load beam and a flexure of a head suspension so as to facilitate efficient and accurate alignment and construction of the flexure relative to the load beam.

BACKGROUND OF THE INVENTION

In a dynamic rigid disk storage device, a rotating disk is typically employed to store information. Rigid disk storage devices typically include a frame to provide attachment points and orientation for other components, and a spindle motor mounted to the frame for rotating the disk. A read/write head is usually provided as part of a "head slider" to be positioned in close proximity to the rotating disk and to enable the writing and reading of data to and from the disk surface. In the case of a magnetic storage device, a magnetic read/write head is employed to create and read magnetic domains to and from the disk surface.

The head slider is supported and properly oriented in relationship to the disk by a head suspension that provides forces and compliances necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk which is referred to as the "fly height."

Typical head suspensions for rigid disk drives include a load beam and a flexure. The load beam normally includes a mounting region at a proximal end of the load beam for mounting the head suspension to an actuator of the disk drive, a rigid region, and a spring region between the mounting region and the rigid region for providing a spring force to counteract the aerodynamic lift force generated on the head slider during the drive operation as described above. The flexure typically includes a gimbal region having a slider mounting surface where the head slider is mounted and thereby supported in read/write orientation with respect to the rotating disk. The gimbal region is resiliently moveable with respect to the remainder of the flexure in response to the aerodynamic forces generated by the air bearing and to permit the head slider to follow disk surface fluctuations.

In one type of head suspension the flexure is formed as a separate piece having a load beam mounting region which is rigidly mounted to the distal end of the load beam using conventional means such as spot welds. Such head suspensions typically include a load point dimple formed in either the load beam or the gimbal region of the flexure. The load point dimple transfers a predetermined load generated by the spring region of the load beam to the flexure and the head slider to counteract the aerodynamic force generated by the action of the air bearing against the head slider and to define the desired fly height. Such a load point dimple also provides clearance between the flexure and the load beam, and serves as a point about which the head slider can gimbal in pitch and roll directions so as to follow fluctuations in the disk surface.

Due to the close proximity of the head slider and the rotating disk at the fly height of the head slider, it is important that the head slider be properly positioned over the disk at the desired fly height. The position of the head suspension and head slider, also known as the static attitude, is calibrated so that when the disk drive is in operation the head slider assumes an optimal orientation at the fly height. It is therefore important that the static attitude of the head suspension be properly established. Toward this end, the flexure must be mounted to the load beam so that misalignments between the flexure and the load beam are minimized since misalignments between the load beam and flexure may introduce a bias in the static attitude of the head suspension and the head slider. Misalignments in the head suspension components also affect the alignment of the load point dimple in relation to the head slider when the head slider is mounted to the head suspension. Misalignments between the load point dimple and the head slider may cause a static attitude torque to be exerted on the head slider, and thus affect the orientation of the head slider at the fly height.

To assist in the proper alignment of the flexure to the load beam and the proper alignment of the head slider to the head suspension, the load beam and the flexure of a head suspension each typically include a circular tooling hole having a pre-determined diameter. These tooling holes facilitate alignment of the flexure on the load beam through the insertion of a tooling pin in both of these holes prior to mounting the flexure to the load beam, thus concentrically aligning the tooling holes. The flexure can then be spot welded or otherwise attached to the load beam, and the resultant head suspension will be aligned based on the accuracy of the positioning and sizing of both tooling holes. Thus, to obtain accurate alignment, strict tolerances for the tooling holes must be maintained.

The tooling holes in the flexure and the load beam are also used to facilitate the mounting of the head slider to the head suspension. A tooling pin is inserted in the flexure and load beam holes later in the assembly process to hold the head suspension in place during the head slider mounting procedure. The location of the load point dimple on the head suspension is determined, and the slider is aligned and mounted to the head suspension at a desired location. Thus, to obtain accurate alignment of the head slider, it is important that the flexure be accurately aligned and mounted to the load beam of the head suspension so that the load point dimple is correctly oriented on the head suspension.

The mounting of an individual flexure on an individual load beam using an alignment pin is very time intensive. Thus, carrier strip assemblies have recently been employed to more efficiently manufacture head suspensions. In a carrier strip manufacturing process, multiple flexures are formed while attached to a first carrier strip assembly, and multiple load beams are similarly formed while attached to a second carrier strip assembly. Reference holes in the carrier strip assemblies are then used to align the plurality of individual load beams over a corresponding number of flexures, and the flexures are conventionally mounted on the load beams. In this manner, head suspensions can be more efficiently manufactured. Because a pin is not used to align the tooling holes in the individual flexures and load beams, however, it sometimes occurs that even with the individual flexures and the individual load beams aligned by this method, the flexure tooling hole and the load beam tooling hole might slightly overlap. Any overlap in the tooling holes, however, will create an undersized hole that may prevent a tooling pin from later being inserted through the holes, for example, during the mounting of the head slider to the head suspension.

It is important to be able to accurately and efficiently determine any misalignments between the flexure and the load beam of a head suspension. A determination of the misalignment will indicate whether the head suspension is within predetermined manufacturing tolerances. In addition, a determination of the misalignments allows for such misalignments to be compensated for during the mounting of the head slider to the head suspension.

SUMMARY OF THE INVENTION

The present invention overcomes the deficiencies and shortcomings of the prior art by providing an improved head suspension for use in a rigid disk drive and for supporting a head slider over a disk surface wherein an efficient evaluation and quantification of the alignment between head suspension components can be made. The present invention also provides a head suspension wherein head suspension apertures can be engaged by a tooling pin even in the presence of small misalignments in the head suspension components.

A head suspension in accordance with the present invention comprises a load beam and a flexure. The load beam of the head suspension has an actuator mounting region, a loading region at a distal end of the load beam, a spring region positioned distally from the actuator mounting region, and a rigid region between the spring region and the loading region. The flexure is mounted at the distal end of the load beam, and the flexure comprises a gimbal region having a slider mounting surface and a load beam mounting region that overlaps and is attached to a portion of the rigid region of the load beam. A load point dimple can be formed to extend between the loading region of the load beam and the gimbal region of the flexure, the load point dimple extending from a surface of one of the loading region of the load beam and the gimbal region of the flexure. The load beam further includes a load beam aperture that extends between a first and a second surface of the load beam, and the flexure includes a flexure aperture extending between a first and a second surface of the flexure. A plurality of openings are positioned adjacent one of the load beam aperture and the flexure aperture, and the openings are sized and positioned to expose portions of a perimeter edge of the other one of the load beam aperture and the flexure aperture.

In one embodiment, the plurality of openings comprise first and second notches formed in a surface of the rigid region of the load beam and extending radially from a perimeter edge of the load beam aperture. The first notch is positioned on the perimeter edge to extend substantially along a longitudinal axis of the head suspension, and the second notch is positioned on the perimeter edge to extend substantially along a transverse axis of the suspension. In another embodiment, the plurality of openings comprise first, second, and third notches formed in the surface of the rigid region of the load beam and extending radially from a perimeter edge of the load beam aperture. The first, second, and third notches are positioned about the perimeter edge of the load beam aperture in a known relationship relative to the longitudinal and the transverse axes of the head suspension. In yet another embodiment, the plurality of openings comprise four arcuate windows formed in the load beam rigid region, each arcuate window being spaced apart from the perimeter edge of the load beam aperture. The windows are positioned along a substantially circular path that is concentric with the load beam aperture, and each of the windows is positioned about the path in a known relationship to the longitudinal and transverse axes of the head suspension. As an alternative to each of the above-noted embodiments, the openings can instead be provided about the aperture of the flexure.

DETAILED DESCRIPTION OF THE INVENTION

Figure 1:
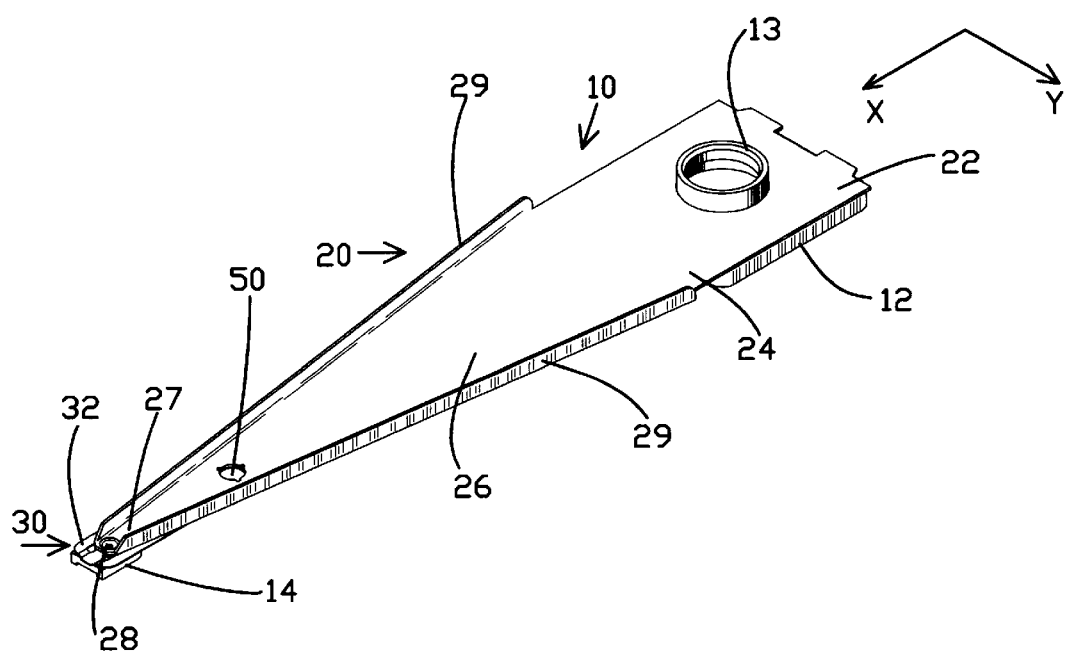
FIG. 1 is an isometric view of a head suspension in combination with a head slider, the head suspension having an alignment measurement pattern in accordance with the present invention.
Figure 2:
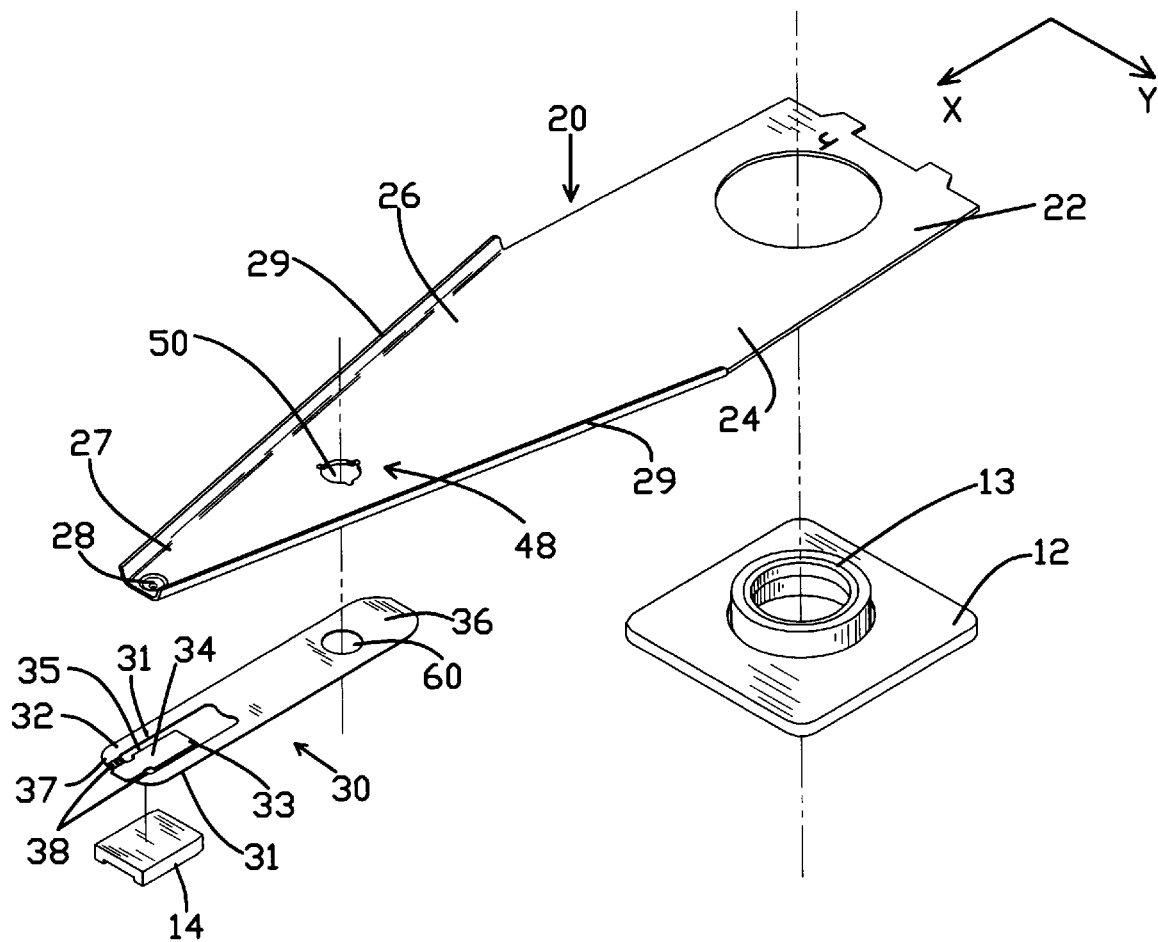
FIG. 2 is an exploded isometric view of the head suspension and head slider combination shown in FIG. 1.
Figure 3:
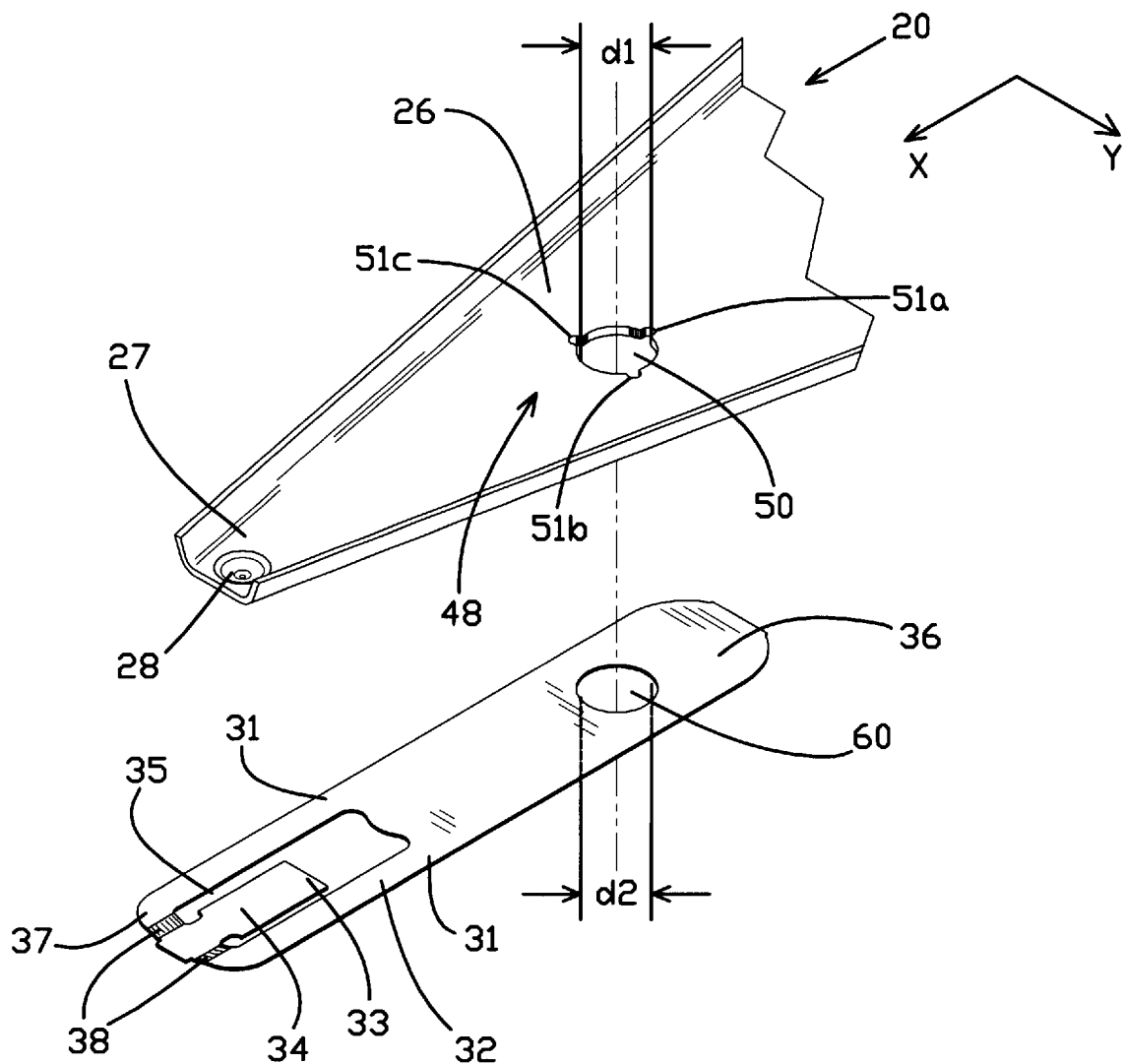
FIG. 3 is an enlarged fragmentary view of the load beam and flexure of a head suspension shown in FIG. 2.

Referring now to the drawings, FIGS. 1–3 generally illustrate a head suspension 10 for supporting a head slider 14 within a dynamic disk drive (not shown), wherein the head suspension 10 contains an alignment measurement pattern 48 in accordance with the present invention. Head suspension 10 includes a longitudinal axis x and a transverse axis y that is orthogonal to the longitudinal axis. Head suspension 10 is generally comprised of a load beam 20 and a flexure 30 at a distal end of load beam 20. Load beam 20 is comprised of mounting region 22 at a proximal end of load beam 20, a rigid region 26, and a spring region 24 between mounting region 22 and rigid region 26. A base plate 12 is attached to load beam 20 at mounting region 22 using conventional means such as spot welds. A swage boss 13 extends from base plate 12 for mounting head suspension 10 to a rotary actuator (not shown) of the rigid disk drive. In this manner, head suspension 10 can be positioned over an associated disk to read data from or write data to the disk during the operation of the disk drive.

Spring region 24 of load beam 20 typically includes a bend or radius to provide a spring force used to counteract the aerodynamic lift force that is generated during use of the disk drive, both the spring force and the lift force acting on a head slider 14 attached to flexure 30 to define the fly height of the head slider 14 (as described in the Background section). The spring force is transferred to a load region 27 at the distal end of load beam 20 via rigid region 26 of load beam 20, and is transmitted to flexure 30 by a load point dimple 28 formed in load region 27 that contacts flexure 30. Rigid region 26 typically includes stiffening rails 29 to enhance the load transition ability of rigid region 26.

Flexure 30 includes a gimbal region 32 having a cantilever beam, or tongue, 34, which includes a slider mounting surface 35 to which head slider 14 is mounted using conventional means such as adhesive. A free end 33 of tongue 34 is vertically moveable in response to pitch and roll movements of head slider 14. Flexure 30 further includes arms 31 which extend longitudinally from a cross piece 37 on a distal end of flexure 30. Offset bends 38 are also illustrated in cross piece 37 to provide a planar slider mounting surface 35 for slider 14 that is offset from arms 31 so as to provide additional clearance for slider pitch and roll movements. Flexure 30 also includes a load beam mounting region 36 at the proximal end of flexure 30, and the load beam mounting region 36 overlaps and is secured to a portion of rigid region 26 of load beam 20 by spot welding or other conventional means.

Load point dimple 28 can be formed in the load region 27 of load beam 20 to contact tongue 34 of flexure 30, and in this manner transmit the spring force of the spring region 24 to the head slider 14 to counteract the aerodynamic lift force created by an air bearing generated by the rotating disk. The load point dimple 28 can alternatively be formed in tongue 34 to contact load region 27 of load beam 20. Head slider 14 is thereby positioned at the "fly height" over the rotating disk as is generally known. Load point dimple 28 also provides a displacement between load region 27 of load beam 20 and tongue 34 of flexure 30 and acts as a pivot point about which head slider 14 can gimbal in response to pitch and roll variations in the aerodynamic forces acting upon head slider 14. It is important that the slider be properly positioned over the rotating disk at the slider fly height due to the close proximity of the head slider 14 to the rotating disk. Because the load point dimple 28 transmits the spring force that counteracts the aerodynamic lift force, and further because it provides a gimbal point for slider 14, it is important that flexure 30 and slider 14 be accurately mounted to load beam 20 to ensure the proper positioning of head slider 14 and the proper functioning of head suspension 10.

As is generally seen in FIGS. 1-3, flexure 30 and load beam 20 each contain an aperture which are aligned during the mounting of the flexure 30 to the load beam 20. Specifically, load beam 20 includes a load beam aperture 50 and flexure 30 includes a flexure aperture 60, which are designed to be as closely aligned and concentric with each other as possible when flexure 30 is mounted to load beam 20. Load beam aperture 50 and flexure aperture 60 have traditionally been of equal diameter, and can be used during the mounting of flexure 30 to align flexure 30 to load beam 20. An alignment pin (not shown) is inserted through the apertures to concentrically align the apertures, and thus the components, during the mounting of flexure 30 on load beam 20. These aligned apertures can also be used later in the assembly process to facilitate the mounting of head slider 14 to slider mounting surface 35 of flexure 30.

Figure 4:
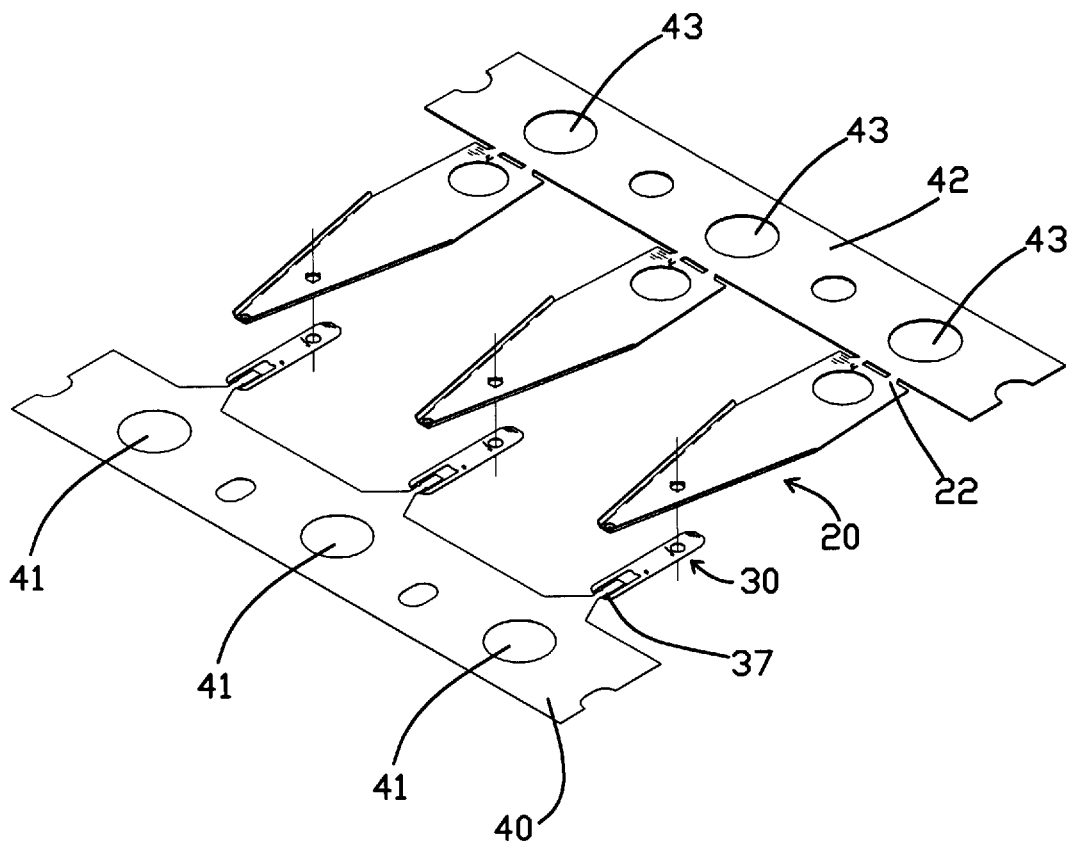
FIG. 4 is an isometric view showing a portion of a load beam carrier strip assembly and a portion of a flexure carrier strip assembly that can be combined in accordance with the present invention.

In recent years, carrier strip assemblies have been developed to increase the efficiency of manufacturing head suspensions, and they are often used in the mounting a series of head suspension flexures to a like series of head suspension load beams. FIG. 4 shows a flexure carrier strip assembly 40 and a load beam carrier strip assembly 42. Flexure carrier strip assembly 40 includes a plurality of flexures 30 formed attached to flexure carrier strip assembly 40 at the cross piece 37 of each flexure 30, and further includes reference holes 41. Similarly, a plurality of load beams 20 are formed and attached to load beam carrier strip assembly 42 at the mounting region 22 of each load beam 20, and load beam carrier strip assembly 42 also includes reference holes 43. Reference holes 41 in the flexure carrier strip assembly 40 and reference holes 43 in the load beam carrier strip assembly 42 are engaged by separate pins on an alignment tool (not shown) which position the individual load beams 20 attached to load beam carrier strip assembly 42 over a corresponding flexure 30 attached to flexure carrier strip assembly 40 at a desired alignment. The flexures 30 are then mounted to the load beams 20 using conventional methods, such as spot welding.

Slight variations and manufacturing tolerances in the flexure and load beam carrier strip assemblies 40 and 42, respectively, and in the individual flexures 30 and load beams 20 are typically present in the assembly of head suspension 10. These variations and manufacturing tolerances can cause misalignments between the load beam aperture 50 and flexure aperture 60, and thus load beam 20 and flexure 30, regardless of which method is used to mount flexure 30 to load beam 20. Furthermore, with conventional equal-diameter apertures, such misalignments cause load beam aperture 50 and flexure aperture 60 to overlap each other, and any overlap between the apertures may prevent the later insertion of a pin in the apertures for the mounting of head slider 14 to head suspension 10. Thus, it is important to evaluate and quantify any misalignments between flexure 30 and load beam 20 to determine if the load beam/flexure structure meets the manufacturing tolerances for head suspensions. Moreover, it is important to evaluate misalignments so that they can be compensated for later in the assembly process during the mounting of the head slider to the head suspension.

Toward this end, FIGS. 1–5 show a first embodiment of an alignment measurement pattern 48 that is formed in the load beam 20 of head suspension 10 to provide an indication of the alignment of the flexure 30 relative to the load beam 20. In the embodiment shown, alignment measurement pattern 48 is formed in the rigid region 26 of load beam 20. An alignment measurement pattern can alternatively be formed in the flexure 30 to provide such an alignment indication, and the following discussion applies equally to such an alignment measurement pattern. Alignment measurement pattern 48 is comprised of a plurality of openings (such as notches 51a, 51b, and 51c of FIGS. 1–5) that extend between a first and second surface of the load beam rigid region 26. The openings of alignment measurement pattern 48 are positioned adjacent the load beam aperture 50. Flexure aperture 60 preferably has a greater diameter than load beam aperture 50 (the reasons for which are described in greater detail below), and the openings of the alignment measurement pattern 48 are sized and positioned to expose portions of the perimeter edge of flexure aperture 60. In this manner, an indication is provided as to the alignment of flexure aperture 60, and thus flexure 30, with respect to load beam aperture 50 and load beam 20. The plurality of openings can be spaced about the load beam aperture 50 in a known relationship to the longitudinal axis x and transverse axis y of head suspension 10 to facilitate the efficient calculation of the offset between the centers of the load beam aperture 50 and flexure aperture 60 (which, as described above, are ideally concentrically aligned).

In the embodiment shown in FIGS. 1–5, the openings of alignment measurement pattern 48 comprise three notches 51a, 51b, and 51c that extend radially from the perimeter of load beam aperture 50. Notches 51a, 51b, and 51c are spaced apart an equal amount from each other about the perimeter edge of load beam aperture 50 (i.e. 120°). Notch 51a is aligned along the negative of the longitudinal axis x of head suspension 10, notch 51b is aligned 30° from the transverse axis y of head suspension 10, and notch 51c is aligned 30° from the negative of the transverse axis. Notches 51a, 51b, and 51c expose arc lengths of the perimeter edge of the flexure aperture 60, and the position of these arc lengths can be measured to provide an indication of the position of flexure aperture 60. While a number of known measurement processes are contemplated for measuring the position of flexure aperture 60, a preferred method is the use of an optical comparator, such as are commercially available from Nikon Incorporated. In such a measuring process, the optical comparator is positioned over the center 52 of load beam aperture 50, and head suspension 10 is preferably illuminated from beneath (i.e., the side of load beam 20 to which flexure 30 is mounted). Such "back lighting" of head suspension 10 clearly defines the arc lengths of flexure aperture 60 visible through notches 51a, 51b, and 51c, and longitudinal and transverse components of individual points along these arc lengths relative to the center 52 of load beam aperture 50 can then be measured using the optical comparator. These points are then used to calculate the position of flexure aperture 60 relative to load beam aperture 50, such as by using known and commercially available computer programs. One such commercially available computer program is the Quindos program, such as is available from Brown & Sharpe Manufacturing Corporation of Kingstown, R.I., which uses a maximum inscribed circle algorithm to calculate the position of flexure aperture 60, including its center 62, based on the measured points along the arc lengths visible through notches 51a, 51b, and 51c. The calculated center of the flexure aperture 60 can then be compared to the center of the load beam aperture 50 to determine the offset between the apertures.

Figure 5:
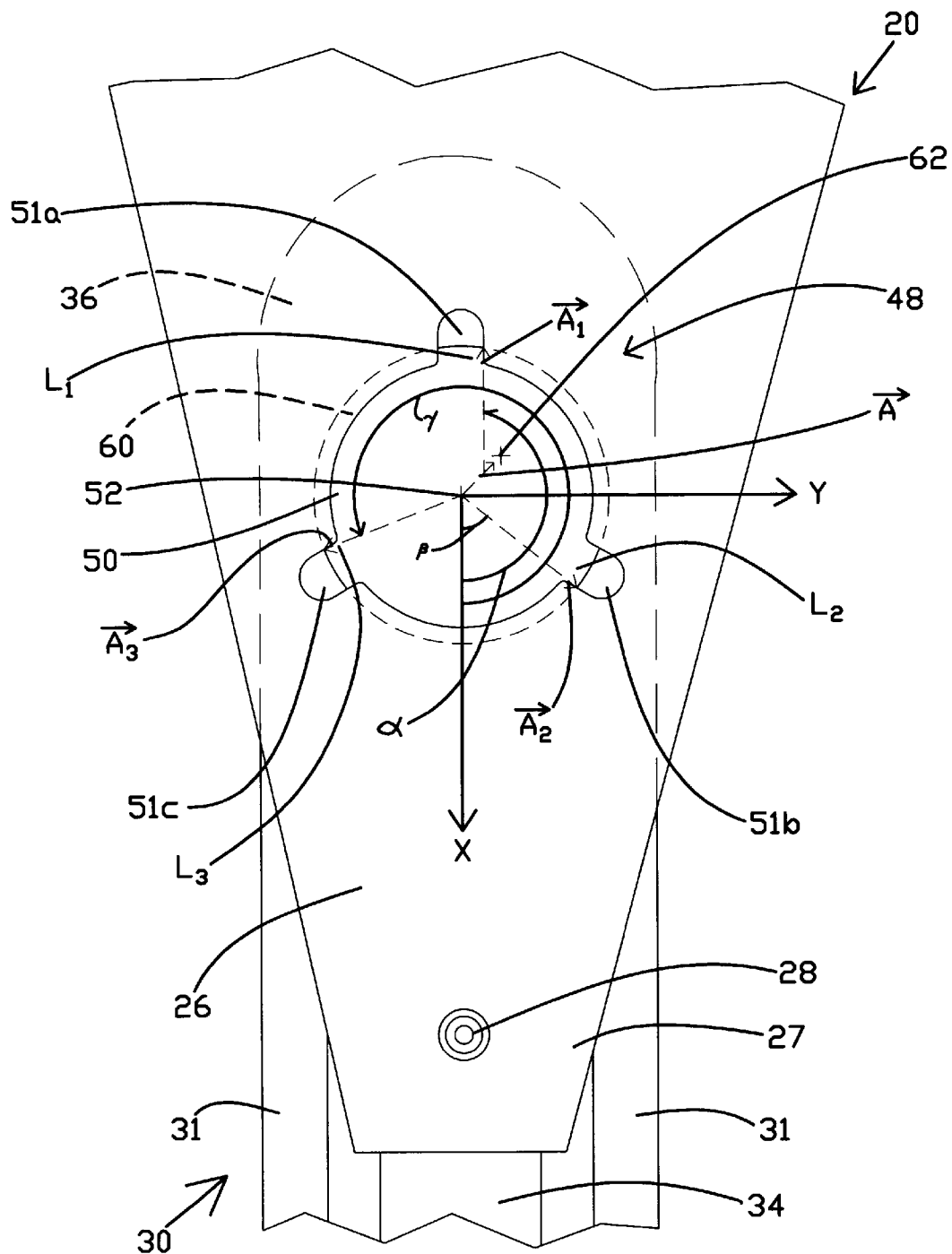
FIG. 5 is a fragmentary top plan view of a head suspension load beam and flexure having an alignment measurement pattern.

Alternatively, the misalignment between the flexure 30 and load beam 20 can be calculated using known trigonometric equations. As illustrated in FIG. 5, scalar alignment values $L_1$, $L_2$, and $L_3$ represent the displacement between the perimeter edge of the load beam aperture 50 and the perimeter edge of flexure aperture 60 as measured at the leading edge of each notch (the leading edge being defined by traversing the load beam aperture 50 in a clockwise direction). The scalar alignment values $L_1$, $L_2$, and $L_3$ can be measured, for example, using an optical comparator as described above. These scalar alignment values $L_1$, $L_2$, and $L_3$ can be used to determine the misalignment between the flexure 30 and load beam 20 as described below.

Scalar alignment values $L_1$, $L_2$, and $L_3$ are comprised of longitudinal and transverse components, and individual alignment vectors $\vec{A}_1$, $\vec{A}_2$, and $\vec{A}_3$ can be calculated based on these scalar values and the position of notches 51a, 51b, and 51c relative to longitudinal axis x and transverse axis y. As illustrated in FIG. 5, notches 51a, 51b, and 51c, and thus alignment vectors $\vec{A}_1$, $\vec{A}_2$, and $\vec{A}_3$ are positioned at a known location about load beam aperture 50 relative to the longitudinal and transverse axes of head suspension 10. Specifically, $\alpha$ represents the angle between vector $\vec{A}_1$ and the x axis, $\beta$ represents the angle between vector $\vec{A}_2$ and the x axis, and $\gamma$ represents the angle between vector $\vec{A}_3$ and the x axis. Individual alignment vectors $\vec{A}_1$, $\vec{A}_2$, and $\vec{A}_3$ can thus be reduced into their longitudinal and transverse components as follows:

$$\vec{A}_1 = L_1 \cos(\alpha)\hat{i} + L_1 \sin(\alpha)\hat{j}$$

$$\vec{A}_2 = L_2 \cos(\beta)\hat{i} + L_2 \sin(\beta)\hat{j}$$

$$\vec{A}_3 = L_3 \cos(\gamma)\hat{i} + L_3 \sin(\gamma)\hat{j}$$

where, consistent with traditional trigonometric nomenclature, $\hat{i}$ is the unit vector along the longitudinal axis x, and $\hat{j}$ is the unit vector along the transverse axis y of head suspension 10. As described above, notch 51a is positioned along the negative x axis (i.e. $\alpha$ is 180°), notch 51b is positioned 30° from the y axis (i.e. $\beta$ is 60°), and notch 51c is positioned 30° from the negative y axis (i.e. $\gamma$ is 300°). As such, the alignment vectors $\vec{A}_1$, $\vec{A}_2$, and $\vec{A}_3$ reduce to:

$$\vec{A}_1 = -(L_1)\hat{i}$$

$$\vec{A}_2 = L_2(0.500)\hat{i} + L_2(0.866)\hat{j}$$

$$\vec{A}_3 = L_3(0.500)\hat{i} - L_3(0.866)\hat{j}$$

Figure 6:
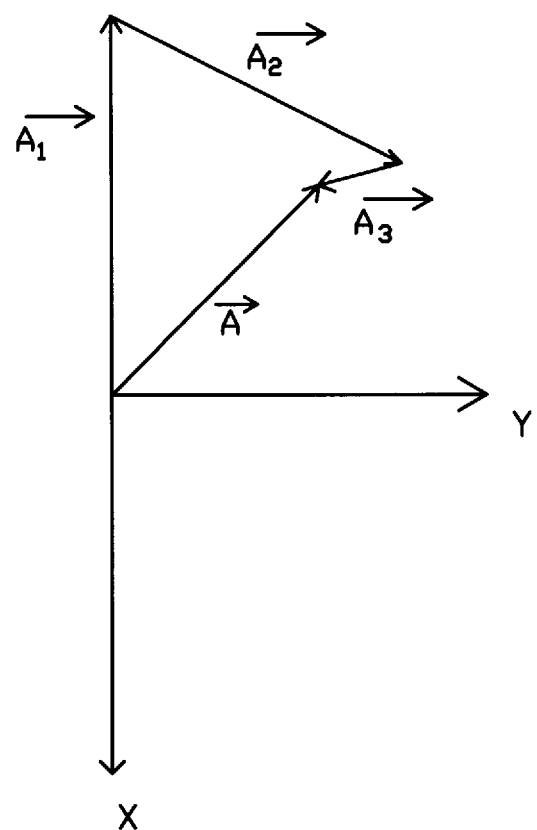
FIG. 6 is a vector diagram showing the total misalignment vector measured by the alignment measurement pattern.

The total misalignment between the center 52 of load beam aperture 50 and center 62 of flexure aperture 60 is represented by vector $\vec{A}$. Because notches 51a, 51b, and 51c of alignment measurement pattern 48 are equally spaced about the perimeter edge of load beam aperture, total misalignment vector $\vec{A}$ can be calculated as the vector sum of individual alignment vectors $\vec{A}_1$, $\vec{A}_2$, and $\vec{A}_3$. FIG. 6 illustrates the summation of the individual alignment vectors $\vec{A}_1$, $\vec{A}_2$, and $\vec{A}_3$ of FIG. 5 to calculate misalignment vector $\vec{A}$. In other words, the longitudinal and transverse misalignments between the flexure 30 and load beam 20 can be calculated from the scalar alignment values $L_1$, $L_2$, and $L_3$ measured at the openings of alignment measurement pattern 48. For the embodiment shown in FIGS. 1–5, total misalignment vector $\vec{A}$ is calculated as:

$$\vec{A} = \vec{A}_1 + \vec{A}_2 + \vec{A}_3 \Rightarrow$$

$$\vec{A} = (L_1 \cos\alpha + L_2 \cos\beta + L_3 \cos\gamma)\hat{i} + (L_1 \sin\alpha + L_2 \sin\beta + L_3 \sin\gamma)\hat{j} \Rightarrow$$

$$\vec{A} = (-L_1 + 0.5L_2 + 0.5L_3)\hat{i} + 0.866(L_2 - L_3)\hat{j}$$

For the case where load beam aperture 50 and flexure aperture 60 are concentrically aligned, scalar alignment values $L_1$, $L_2$, and $L_3$ should be equal, and the total misalignment vector $\vec{A}$ reduces to zero as expected.

Whether calculated using a commercially available software program or through the use of trigonometric equations, the misalignment vector $\vec{A}$ between load beam aperture 50 and flexure aperture 60 can be used to determine whether the alignment of the flexure 30 and load beam 20 of head suspension 10 is within prescribed tolerances. Specifically, the longitudinal and transverse components of the misalignment vector $\vec{A}$ can be compared against predetermined threshold values. In this manner, a quality control process, such as a "pass/fail" determination as to the alignment of suspension 10, can be performed.

As noted above, load beam aperture 50 and flexure aperture 60 have traditionally been formed to have an equal, pre-determined diameter that corresponds to the diameter of the tooling pin used to facilitate the alignment of the parts and the attachment of head slider 14 to head suspension 10. The alignment measurement pattern 48 described above works equally well with apertures that are equally sized to accommodate such a tooling pin. In the embodiment shown in FIGS. 1–5, however, load beam aperture 50 has a diameter $d_1$ that substantially corresponds to the diameter of the tooling pin, while flexure aperture 60 has a diameter $d_2$ that is greater than $d_1$. Load beam aperture 50 can alternatively have a diameter that is larger than flexure aperture 60, such as when alignment measurement pattern 48 is on flexure 30 instead of load beam 20. As described in the Background section, conventional load beam and flexure apertures having the same diameter will overlap each other when the flexure and load beam are assembled using a carrier strip process if the slightest misalignment between the flexure and the load beam is present. This in turn can prevent an alignment tool from being inserted through the apertures during the mounting of the head slider to the head suspension. Flexure aperture 60 having a diameter $d_2$ that is greater than diameter $d_1$ of load beam flexure 50 overcomes this shortcoming of prior art head suspensions. Specifically, because diameter $d_2$ is greater than diameter $d_1$, the perimeter edge of flexure aperture 60 does not overlap and encroach upon the perimeter edge of load beam aperture 50 when the flexure 30 and load beam 20 are slightly misaligned. As such, the tooling pin can be inserted through the apertures during the mounting of the head slider 14 to head suspension 10 even in the presence of slight misalignments. Moreover, as demonstrated by the equations set forth above, so long as the openings of alignment measurement pattern 48 are equally spaced about the perimeter edge of the load beam aperture 50, the total misalignment vector $\vec{A}$ between the flexure 30 and load beam 20 can be calculated independent of the diameters $d_1$ and $d_2$ of load beam aperture 50 and flexure aperture 60, respectively.

Figure 7:
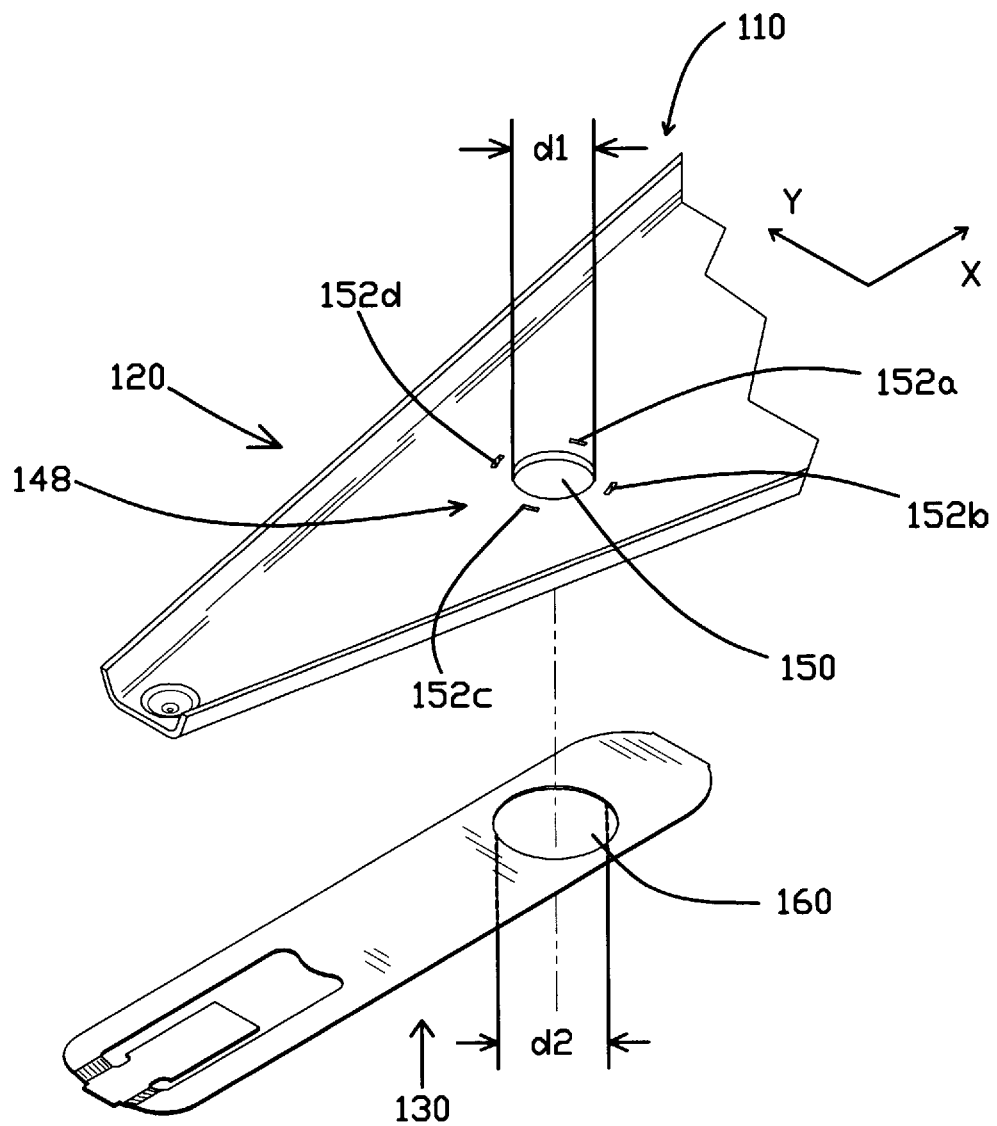
FIG. 7 is a fragmentary isometric exploded view of a second embodiment of a head suspension load beam and a flexure having an alignment measurement pattern also in accordance with the present invention.
Figure 8:
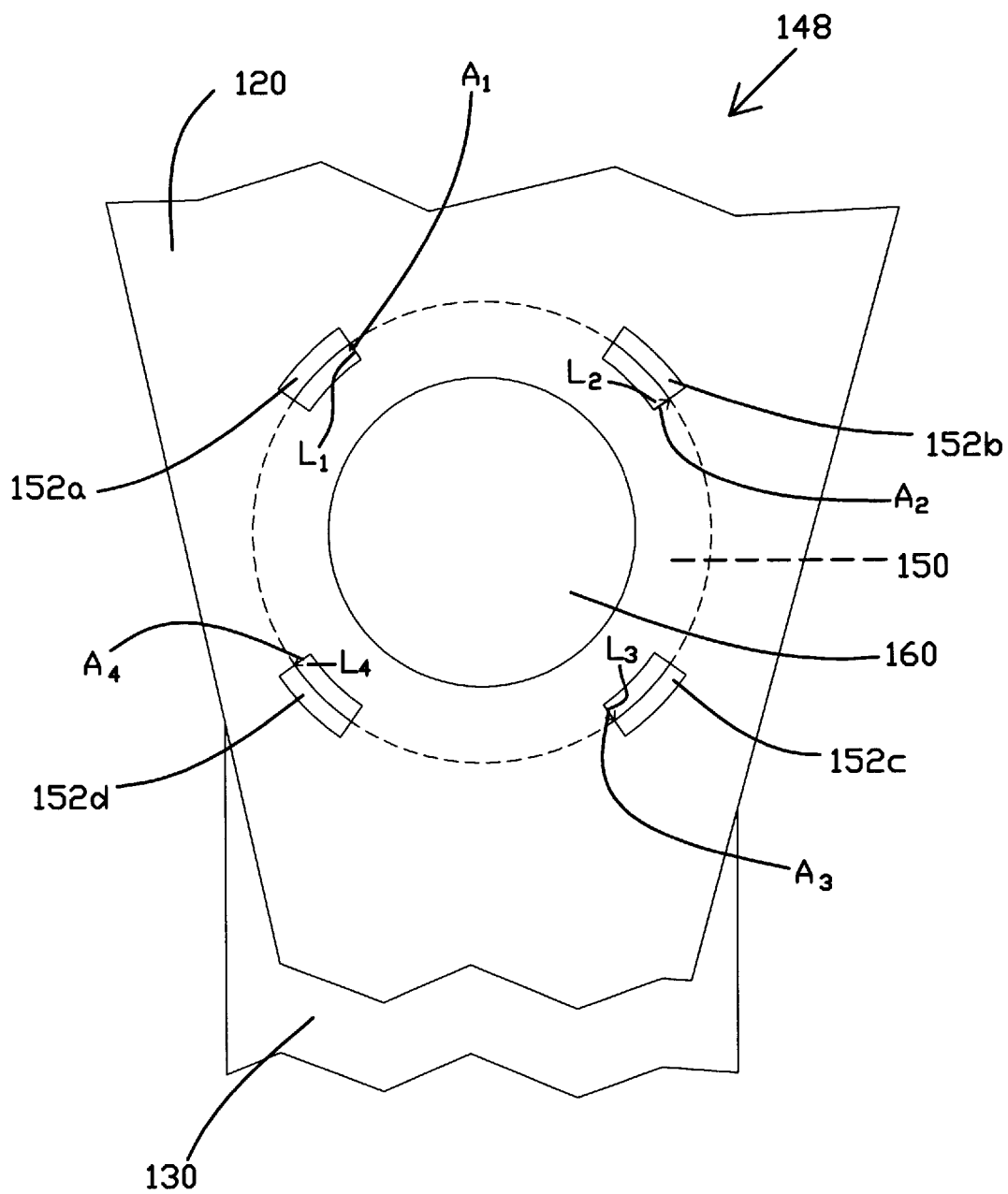
FIG. 8 is a fragmentary top plan view of the head suspension load beam and flexure of FIG. 7.

Another embodiment of the present invention is shown in FIGS. 7 and 8. Features of the head suspension 110 and alignment measurement pattern 148 shown in FIGS. 7 and 8 that are similar to those shown in FIGS. 1–5 are designated using the same reference numeral preceded by a "1". Load beam aperture 150 in load beam 120 and flexure aperture 160 in flexure 130 are positioned to be concentric with each other when flexure 130 is mounted to load beam 120, and alignment measurement pattern 148 having a plurality of openings is formed in load beam 120. Flexure aperture 160 is again sized to have a diameter that is greater than the diameter of load beam aperture 150. In this embodiment, the openings of alignment measurement pattern 148 comprise four curved windows 152a, 152b, 152c, and 152d. As above, alignment measurement pattern 148 can be on flexure 130 instead, and load beam aperture 150 can be the larger of the two apertures.

Windows 152a, 152b, 152c, and 152d are sized and shaped to expose a perimeter edge of the oversized flexure aperture 160 to provide an indication of the alignment of flexure 130 relative to load beam 120. Toward this end, windows 152a, 152b, 152c, and 152d of alignment measurement pattern 148 are spaced apart from the perimeter edge of load beam aperture 150, and are positioned along a circular path that surrounds and is concentric with load beam aperture 150. Similar to the notches of the first embodiment shown in FIGS. 1–5, windows 152a, 152b, 152c, and 152d are spaced an equal distance from each other (i.e. 90°) and are aligned relative to the longitudinal axis x and transverse axis y of head suspension 110 in a known, predetermined manner. The arc lengths of flexure aperture 160 visible through windows 152a, 152b, 152c, and 152d can be measured using an optical comparator as described above, and the offset between flexure aperture 160 and load beam aperture 150 can be calculated using commercially available software programs. Alternatively, scalar alignment values $L_1$, $L_2$, $L_3$, and $L_4$ can be measured at each window, and can be used to calculate individual alignment vectors $\vec{A}_1$, $\vec{A}_2$, $\vec{A}_3$, and $\vec{A}_4$ using known trigonometric equations similar to those derived above. Because windows 152a–152d are equally spaced about load beam aperture 150, the vector sum of these vectors produces the total misalignment vector between the centers 152 and 162 of the load beam aperture 150 and flexure aperture 160, respectively.

While the first and second embodiments of the present invention described above and shown in FIGS. 1–8 include three and four alignment measurement pattern openings, respectively, that are spaced an equal distance from each other around the perimeter edge of the load beam aperture, any number of a plurality of openings (i.e. any number more than one) can be provided in any known configuration around the perimeter edge the aperture. Having equally spaced openings allows for an efficient measurement of the offset between the load beam aperture and flexure aperture using vector analysis of measured displacements between the apertures. However, the misalignment between the head suspension components can be quantified with an alignment measurement pattern having unequally spaced openings using commercially available software programs, such as the Quindos program described above, because the points along the arc lengths of the flexure aperture define and construct the position of the flexure aperture. In addition, other conventional mathematical algorithms can be used so long as the relationship between the size of the head suspension apertures is known and so long as the positions of the alignment measurement pattern openings relative to the longitudinal and transverse axes of the head suspension are known. One such method for calculating the offset is based upon the conventional algorithm known as the "least squares" or "averaged diameter circle in a hole" algorithm.

Figure 9:
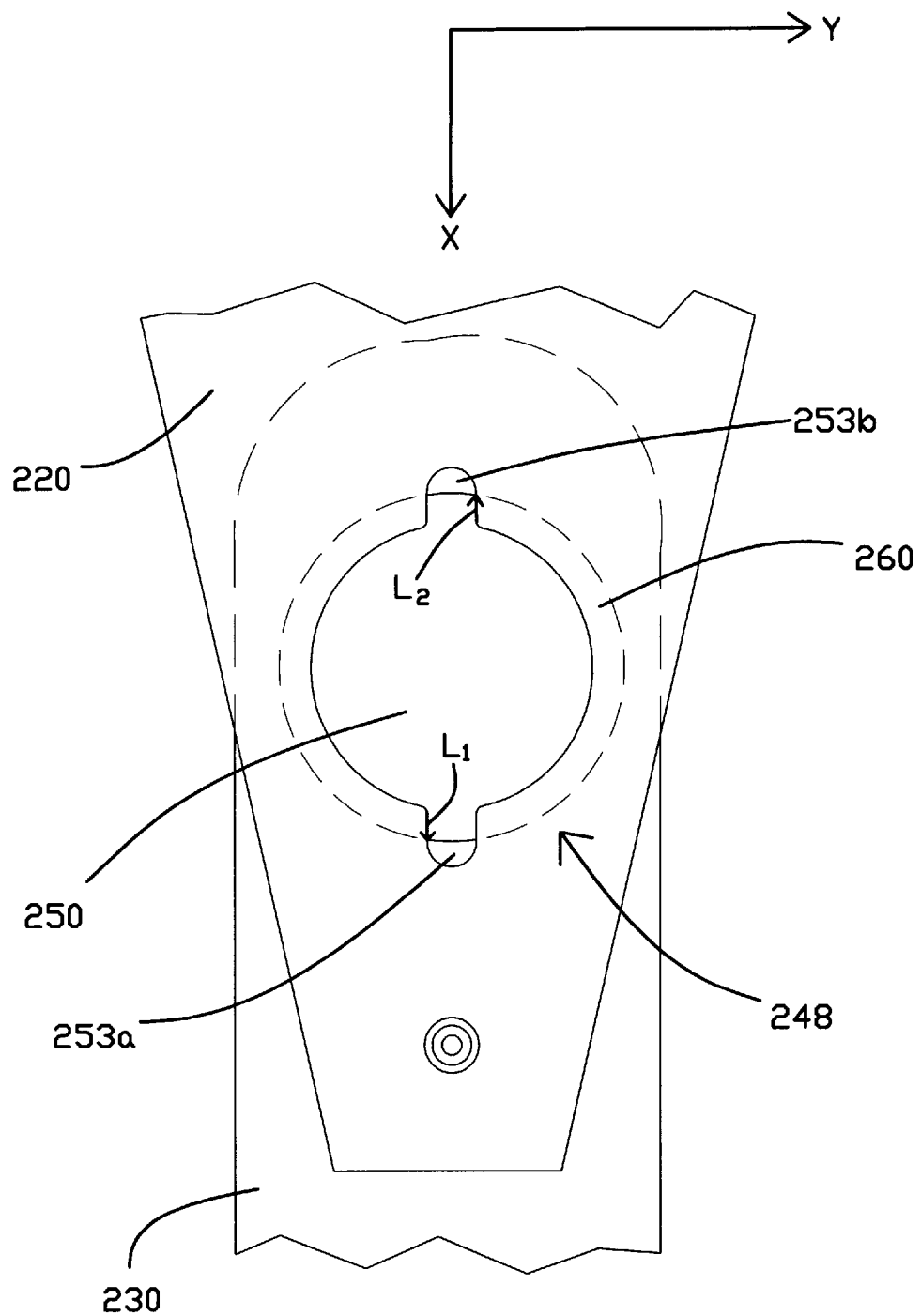
FIG. 9 is a fragmentary top plan view of a third embodiment of a head suspension load beam and flexure having an alignment measurement pattern also in accordance with the present invention.

A third embodiment of the present invention is shown in FIG. 9. Identical components to those shown in FIGS. 1–5 are designated with similar reference numerals preceded by the prefix "2." Head suspension 210 includes an alignment measurement pattern 248 formed in load beam 220. The openings of alignment measurement pattern 248 comprise a pair of notches 253a and 253b that extend from the perimeter edge of load beam aperture 250 and that are sized and positioned to expose the outer perimeter of a flexure aperture 260 formed in a load beam mounting region 236 of flexure 230. Similar to the first two embodiments described above, flexure aperture 260 is formed having a diameter $d_2$ that is greater than the diameter $d_1$ of the load beam aperture 250 to allow the later insertion of an alignment pin for mounting a head slider to head suspension 210 regardless of small misalignments in head suspension 210. As above, alignment measurement pattern 248 can be on flexure 230 instead, and load beam aperture 250 can be the larger of the two apertures.

Notches 253a and 253b are aligned along a common axis (i.e. they are spaced 180° apart), and scalar alignment values $L_1$ and $L_2$ can be measured at notches 253a and 253b in the manner described above. In the embodiment shown in FIG. 9, notch 253a is aligned substantially along the longitudinal axis x of head suspension 210, and notch 253b is aligned substantially along the negative longitudinal axis x of the head suspension 210. As such, scalar alignment values $L_1$ and $L_2$ can be used to calculate the magnitude of the longitudinal misalignment between flexure aperture 260 and load beam aperture 250. Notches 253a and 253b can also be aligned at other orientations around load beam aperture 250 along a common axis, such as along the positive and negative transverse axis y, to provide an indication of the misalignment in the direction of the axis of the notches. Such an alignment measurement pattern 248 is thus particularly useful when the misalignment.

Although the present invention has been described with reference to preferred embodiments, those skilled in the art will recognize that changes may be made in form and detail without departing from the spirit and scope of the invention. For example, the alignment measurement pattern openings can be any shape that provides an indication as to the perimeter edge of the aperture beneath the opening.

What is claimed is:

1. A head suspension for use in a rigid disk drive and for supporting a head slider over a disk surface, comprising:

a load beam having an actuator mounting region, a load region at a distal end of the load beam, a spring region positioned distally from the actuator mounting region, and a rigid region between the spring region and the loading region;

a flexure mounted at the distal end of the load beam, the flexure comprising a gimbal region having a slider mounting surface, and a load beam mounting region that overlaps a portion of the rigid region of the load beam, wherein the load region of the load beam contacts the gimbal region of the flexure;

a load beam aperture extending between a first and a second surface of the load beam;

a flexure aperture extending between a first and a second surface of the flexure; and an alignment measurement pattern comprising a plurality of openings adjacent one of the load beam aperture and the flexure aperture, the plurality of openings being sized and positioned to expose portions of a perimeter edge of the other one of the load beam aperture and the flexure aperture than the one with the plurality of openings.

2. The head suspension of claim 1 wherein the contact between the load region and the gimbal region is by way of a load point dimple that extends between the load region and the gimbal region from a surface of one of the load region and the gimbal region.

3. The head suspension of claim 1, wherein:

the load beam aperture is a substantially circular hole;

the flexure aperture is a substantially circular hole; and the other of the load beam aperture and the flexure aperture without the alignment measurement pattern has a diameter that is greater than the diameter of the one of the load beam aperture and the flexure aperture with the alignment measurement pattern.

4. The head suspension of claim 1 wherein the plurality of alignment measurement pattern openings are adjacent the load beam aperture in a known relationship to a longitudinal axis and a transverse axis of the head suspension.

5. The head suspension of claim 4 wherein the plurality of alignment measurement pattern openings are spaced apart from each other by an equal distance about the perimeter edge of the load beam aperture.

6. The head suspension of claim 5 wherein each of the plurality of alignment measurement pattern openings comprises a notch that radially extends from a perimeter edge of the load beam aperture.

7. The head suspension of claim 6 wherein the plurality of alignment measurement pattern openings includes three notches, each notch being spaced 120° apart from the other two notches.

8. The head suspension of claim 4 wherein the plurality of alignment measurement pattern openings includes first and second notches, each notch extending radially from a perimeter edge of the load beam aperture.

9. The head suspension of claim 8 wherein the first notch is aligned substantially along the longitudinal axis of the head suspension and the second notch is aligned substantially along the transverse axis of the head suspension.

10. The head suspension of claim 4 wherein each of the plurality of openings comprises an arcuate window spaced apart from the perimeter edge of the load beam aperture, the plurality of windows positioned along a substantially circular path that is concentric with the load beam aperture.

11. The head suspension of claim 10 wherein the plurality of windows includes four windows, the windows being spaced 90° apart from each other along the substantially circular path.

12. A method of manufacturing a head suspension for use in a rigid disk drive and for supporting a head slider over a disk surface, comprising the steps of:

providing a flexure having a gimbal region and a load beam mounting region;

providing a load beam having an actuator mounting region, a loading region at a distal end of the load beam, a spring region positioned distally from the actuator mounting region, and a rigid region between the spring region and the loading region;

providing a first aperture extending between a first and a second surface of one of the load beam and the flexure;

providing a second aperture extending between a first and a second surface of the other one of the load beam and the flexure;

providing a plurality of openings adjacent the first aperture, the openings sized and positioned to expose portions of a perimeter edge of the second aperture;

mounting the load beam mounting region of the flexure to a portion of the rigid region load beam region so that the first aperture is adjacent the second aperture; and measuring the position of the flexure relative to the load beam by measuring the displacement of the first and second apertures relative to one another at the plurality of openings.

13. The method of manufacturing a head suspension of claim 12, wherein the step of providing a second aperture includes providing a second aperture that has a diameter that is greater than the first aperture.

14. The method of manufacturing a head suspension of claim 12, further including the step of calculating an alignment vector between the first and second apertures based upon the measurements made at the plurality of openings.

15. The method of manufacturing a head suspension of claim 12, further including the step of comparing the measurements made at the openings to pre-determined threshold values to determine if the head suspension is within manufacturing tolerances.

* * * * *